March 15, 1955  W. P. OEHLER ET AL  2,704,018
ADJUSTABLE SPRING CUSHIONED HITCH DEVICE
Filed March 26, 1951
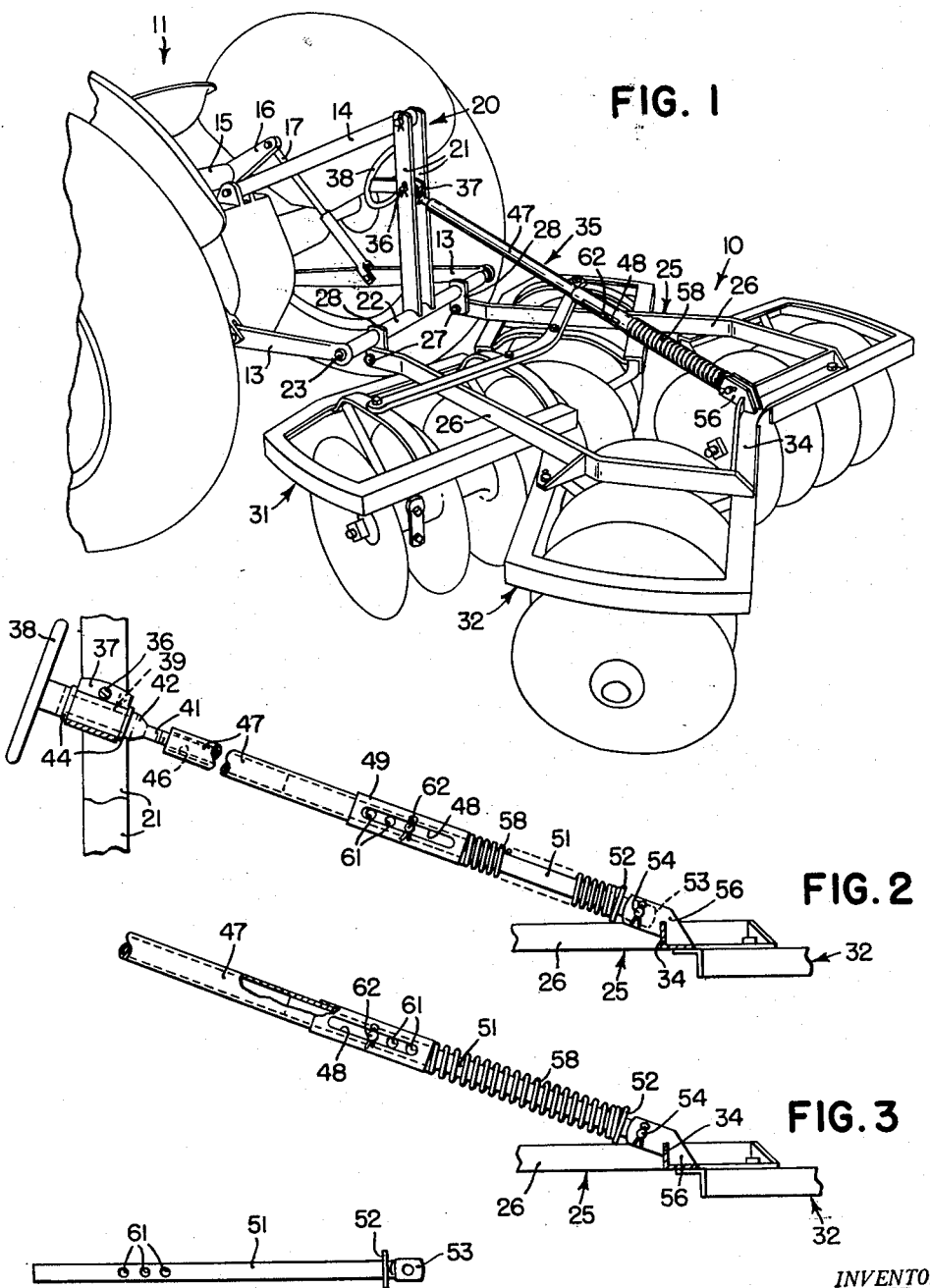
INVENTORS.
WILLIAM P. OEHLER
CHARLES H. YOUNGBERG
BY
ATTORNEYS

United States Patent Office 2,704,018
Patented Mar. 15, 1955

2,704,018

ADJUSTABLE SPRING CUSHIONED HITCH DEVICE

William P. Oehler and Charles H. Youngberg, Moline, Ill., assignors to Deere & Company, Moline, Ill., a corporation of Illinois Application March 26, 1951, Serial No. 217,626

5 Claims. (Cl. 97—47.5)

The present invention relates generally to agricultural implements and more particularly to soil-tilling implements, such as disk harrows and the like.

The object and general nature of the present invention is the provision of an agricultural implement which includes fore-and-aft spaced apart soil-working tools so interconnected that a limited amount of vertical flexibility is provided, and in which means is also provided for holding the tools in a given relative position as, for example, level in operation, with substantially the same amount of permissive departure from said level position, irrespective of the magnitude of the forces necessary to be imposed on the implement part or parts for yieldably holding them in the desired level position.

More specifically, it is a feature of this invention to provide a pick-up harrow adapted to be mounted on a tractor having a power lift, with the harrow and hitch parts associated therewith so constructed and arranged that a limited amount of vertical flexibility is provided, thereby accommodating passage of the outfit over relatively uneven ground without materially affecting the desired depth of operation, yet without sacrificing to any material extent the ability of the tractor power lift to raise the implement off the ground a distance sufficient to prevent any part of the implement from striking the ground, as when passing over rough terrain or the like.

More specifically, it is a feature of this invention to provide a spring cushioned connection between the front and rear portions of an agricultural implement, with means for adjusting the amount of distortion imposed on the spring, as may be necessary to hold the implement in the proper working position under various soil conditions, and in which the parts are so constructed and arranged to provide substantially the same amount of vertical flexibility, irrespective of the adjustments necessary to maintain the implement in the desired level operating position.

These and other objects and advantages of the present invention will be apparent to those skilled in the art as a consideration of the following detailed description, taken in conjunction with the accompanying drawings, in which:

Figure 1 is a perspective view of a pick-up type disk harrow in which the principles of the present invention have been incorporated.

Figures 2 and 3 are enlarged fragmentary views of the details of the adjustable spring cushioning means connected between the hitch structure and the rear portion of the implement.

Figure 4 is a detail of one of the parts shown in Figures 2 and 3.

Referring first to Figure 1, the present invention has been illustrated as embodied in a pick-up implement, specifically, a disk harrow 10 connected to a tractor 11 and supported by the latter at all times, both in operating and in transport positions. The harrow 10 is shown as connected to the tractor 11 through a pair of lower tension links 13 and an upper compression or control link 14, which normally form a part of the tractor 11. The latter carries a power lift unit 15 that includes a pair of power lift arms 16, and the latter are connected with the lower tension links through lifting links 17. A hitch frame 20 is provided for connecting the implement 10 to the links 13 and 14. The hitch frame 20 includes a pair of vertically extending bars 21 fixed at their lower ends to a transverse bar 22 that carries laterally outwardly extending lugs 23 to which the rear ends, which are apertured, of the lower tension links 13 are connected. Considered broadly, the disk harrow 10 and the hitch frame 20 may be considered as relatively movable parts of an implement, in which it is desired to control the relative positions of said parts under varying working conditions.

The implement 10 includes an implement frame structure 25 having generally fore-and-aft extending frame bars 26, the forward ends of which are apertured and connected by pivots 27 to lugs 28 that are fixed to and form a part of the transverse hitch frame member 22. The implement frame 25 receives front and rear gang frames 31 and 32, the gang frames normally being fixedly connected to the implement frame 25.

When the implement 10 is lowered into ground-working or operating position, there is a tendency for the disks of the rear gangs to run out of the ground while the front disks have a tendency to run too deep. To counteract this tendency, we provide, according to the principles of the present invention, a spring cushioned and adjustable strut unit 35 and connect the same between a rear bar 34 of the implement frame 25 and an upper portion of the vertical hitch frame bars 21. The spring cushioned strut unit 35 will now be described.

The upper portions of the vertical hitch bars 21 are apertured to receive a pin 36 by which a leveling screw yoke 37 is swivelly connected with the hitch structure 20. An adjusting hand wheel 38 is secured, as by welding, to the upper or forward end of a shaft 39 having a screw threaded portion 41. The shaft is formed with an abutment 42, and the hub portion of the hand wheel 38 serves as a cooperating abutment, between which abutments the leveling screw yoke 37 is disposed. A pair of thrust washers 44 are disposed between the yoke and the abutments just mentioned.

The threaded end 41 of the adjusting member is threaded into the nut section 46 at the upper or forward end of a tubular member 47, the rear or lower portion of which is provided with a slot 48. A sleeve 49 fixed about the slotted portion of the tubular member 47 serves to strengthen and reenforce this portion of the member 47. A lift rod 51 is disposed within the lower portion of the tubular member 47 in telescoping relation and at its lower or rear end carries an abutment in the form of washer 52 welded to the rod 51, the latter being flattened, as at 53 (Figure 2) to receive a pivot pin 54 that is carried by the two side members of a bracket 56 that is fixed, as by welding, to the rear frame bar 34, as best shown in Figure 1. The abutment 52 forms a seat to receive a compression spring 58, the upper end of which bears against the lower or rear end of the tubular member 47. The upper portion of the lift rod member 51 is provided with a plurality of pin-receiving openings 61 spaced apart longitudinally, as best shown in Figures 2, 3 and 4. A pin 62 is adapted to be inserted in any one of the several openings 61 and cooperates with the slots 48, there being a slot in each side of the lower end of the tubular member 47, for two purposes. First, the pin and slots limit the relative movement that can take place between the two telescopically associated members 47 and 51, and second, when the tractor power lift 15 is operated to raise the implement into a transport position the lower ends of the slots 48 cooperate with the pin 62 to limit the downward movement of the rear portion of the harrow. This latter function is particularly important since in pick-up implements of this general construction and arrangement, it frequently is an important matter to secure sufficient lift or elevation at the rear end of the implement.

The operation of the implement described above and incorporating the principles of the present invention is as follows.

When the operator reaches the field to be disked, after having driven to the field with the implement in its raised position entirely out of contact with the ground, the operator first lowers the implement by operating the power lift unit 15 to permit the implement to lower into ground-engaging position. More or less pressure on the rear portion of the implement is required, according to soil conditions, to hold the rear end of the implement to the proper operating depth, and therefore, after first dropping the implement into its working position, the operator will drive a short distance and turn the hand wheel 38 in one direction or the other in order to apply more or less pressure through the compression spring 58 against the rear end of the implement frame, the operator making such adjustments as may be necessary in order to have the rear disks operate at substantially the same level as the front disks so as to secure uniform action. In making these adjustments the operator may find it necessary to initially remove the pin 62 so as to provide for the necessary compression in the spring 58. After the hand wheel 38 has been adjusted to secure the amount of compression necessary in the spring 58 to hold the implement in substantially a level working position, at the depth of operation desired, the operator then stops the outfit, dismounts and inserts the pin 62 into whichever one of the openings 61 that is disposed in a position nearest the center of the slots 48. The pin 62 is then secured in the selected opening, as by cotter pins or the like, and the outfit is then ready for operation. Within the limits of the permissive movement of the pin 62 in the slots 48, the rear portion of the implement may rise and fall, relative to the hitch structure 20, and therefore the implement is adapted to be operated over relatively uneven ground while, at the same time, securing substantially constant depth of operation. However, when it is desired to raise the implement into a transport position, as when turning at the ends or after completing one field and moving to another, the pin 62 moves only through substantially half the length of the slot 48 and then it engages the rear ends of the slots so that further lifting action can be transmitted directly to the rear end of the implement. In this way, the slots 48 can be made fairly short so that, while providing the desired flexibility in operation and accommodating an adjustment of the member 38 to secure a substantially level operation, there is no undesirable tendency for the rear end of the implement to occupy too low a position in transport. Without the elongated upper portion of the lift rod 51, the plurality of spaced apart openings 61 and the ability to place the lifting pin 62 in a central position, relative to the slots 48, in any position or degree of compression of the spring 58, the slots 48 would have to be so long to accommodate all soil conditions that it would be difficult if not impossible to raise the rear end of the implement the amount necessary for safe transport.

While we have shown and described above the preferred structure in which the principles of the present invention have been incorporated, it is to be understood that our invention is not to be limited to the particular details shown and described above but that, in fact, widely different means may be employed in the practice of the broader aspects of our invention.

What we claim, therefore, and desire to secure by Letters Patent is:

1. A ground-working implement adapted to be connected with a tractor to be raised and lowered relative thereto into and out of transport and ground-working positions, including an implement frame, front and rear ground-working tool means carried thereby, a hitch frame connected with the tractor for generally vertical swinging movement relative to the tractor, a generally vertically extending strut fixed at its lower end to the rear portion of said hitch frame, means pivotally connecting the forward portion of said implement frame to the rear portion of said hitch frame for generally vertical movement relative thereto about a transverse axis, a pair of relatively movable, telescopically associated members, means pivotally connecting one member with the rear portion of said implement frame, means including an axially adjustable part for connecting the other member with the upper end of said strut, a spring acting between said members so as to yieldingly resist generally upward movement of the rear portion of said implement frame relative to the forward portion, one of said telescopically associated members having a slot thereon and the adjacent portion of the other member having a plurality of axially spaced apart openings disposed in such positions that at least one of said openings lies generally midway between the ends of said slot in any position of adjustment of said axially shiftable part as may be necessary to secure substantially uniform operation of said front and rear tools, and a pin disposable in the opening that lies substantially midway between the ends of said slot for limiting the permissive movement of the rear end of said implement frame relative to the front end, whereby raising the hitch frame acts through said pin and slot to raise the rear end of said implement frame.

2. A pick-up disk harrow adapted to be connected to a tractor of the type having generally vertically swingable and vertically spaced apart links to receive various kinds of implements, said pick-up disk harrow comprising a vertically arranged hitch means having provision for pivotally receiving the rear ends of said vertically spaced apart links, frame means pivotally connected at its forward end to the lower portion of said hitch means, a pair of telescopically associated members having the inner end of one disposed slidably inside the other, means for pivotally connecting the outer ends of said members with the upper portion of said hitch means and the rear portion of said frame means, respectively, a spring disposed about said one member and connected at its ends with said telescopically associated members so as to yieldingly oppose relative movement thereof and thereby acting between said hitch means and said frame means for holding the latter substantially level in operation, one of the overlapping portions of said members having a slot and the other having a plurality of axially spaced openings, there being a sufficient number of openings so that, whatever the degree of distortion necessary in said spring to hold said frame means in a level position, one of said openings will lie in or adjacent the midpoint between the ends of said slot, and a motion-limiting pin insertable in the opening at or adjacent said midpoint for limiting the relative movement between said telescopically associated members so as to prevent more than a limited amount of movement of the rear portion of said frame means away from said level position.

3. The invention set forth in claim 2, further characterized by adjusting means acting between the upper portion of said hitch means and the associated member for applying an optionally variable amount of pressure against said spring for causing the same to hold said frame means in substantially a level position in operation.

4. A pickup implement adapted to be connected to a tractor of the type having generally vertically swingable and vertically spaced apart links to receive various kinds of implements, said implement comprising a vertically arranged hitch means having provision for pivotally receiving the rear ends of said vertically spaced apart links, frame means pivotally connected at its forward end to the lower portion of said hitch means, a pair of telescopically associated members having the inner end of one disposed slidably inside the other, means for pivotally connecting the outer ends of said members with the upper portion of said hitch means and the rear portion of said frame means, respectively, a spring disposed about said one member and connected at its ends with said telescopically associated members so as to yieldingly oppose relative movement thereof and thereby acting between said hitch means and said frame means for holding the latter substantially level in operation, one of the overlapping portions of said members having a slot and the other having a plurality of axially spaced openings, there being a sufficient number of openings so that, whatever the degree of distortion necessary in said spring to hold said frame means in a level position, one of said openings will lie in or adjacent the midpoint between the ends of said slot, and a motion-limiting pin insertable in the opening at or adjacent said midpoint for limiting the relative movement between said telescopically associated members so as to prevent more than a limited amount of movement of the rear portion of said frame means away from said level position.

5. An agricultural implement adapted to be connected with a mobile propelling agency, said implement comprising a generally vertically arranged hitch means having provision for connection with said propelling agency so as to be held thereby against substantial tilting in a generally fore-and-aft direction, frame means pivotally connected at its forward end to the lower portion of said hitch means, a pair of telescopically associated members having the inner end of one disposed in overlapping relation with respect to the other, means for pivotally connecting the outer ends of said members with the upper portion of said hitch means and the rear portion of said frame means, respectively, a spring connected at its ends with said telescopically associated members so as to yieldingly oppose relative movement thereof and thereby acting between said hitch means and said frame means for holding the latter substantially level in operation, one of the overlapping portions of said members having a slot and the other having a plurality of axially spaced openings, there being a sufficient number of openings so that, whatever the degree of distortion necessary in said spring to hold said frame means in a level position, one of said openings will lie in or adjacent the midpoint between the ends of said slot, and a motion-limiting pin insertable in the opening at or adjacent said midpoint for limiting the relative movement between said telescopically associated members so as to prevent more than a limited amount of movement of the rear portion of said frame means away from said level position.

References Cited in the file of this patent

UNITED STATES PATENTS

| | | |
|---|---|---|
| 2,420,530 | Evans | May 13, 1947 |
| 2,440,550 | Martin | Apr. 27, 1948 |
| 2,462,641 | Hyland | Feb. 22, 1949 |